United States Patent [19]
Schubert

[11] Patent Number: 4,796,458
[45] Date of Patent: Jan. 10, 1989

[54] FORGING MANIPULATOR

[75] Inventor: Peter Schubert, Kaarst, Fed. Rep. of Germany

[73] Assignee: SMS Hasenclever Maschinenfabrik GmbH, Dusseldorf, Fed. Rep. of Germany

[21] Appl. No.: 86,948

[22] Filed: Aug. 19, 1987

[30] Foreign Application Priority Data

Aug. 21, 1986 [DE] Fed. Rep. of Germany ....... 3628407
Sep. 16, 1986 [DE] Fed. Rep. of Germany ....... 3631440
Oct. 11, 1986 [DE] Fed. Rep. of Germany ....... 3635952

[51] Int. Cl.⁴ ..................... B21D 43/00; B61B 13/08
[52] U.S. Cl. ........................................ 72/420; 72/422; 104/248; 105/29.1
[58] Field of Search ................. 72/420, 422; 104/242, 104/243, 248; 105/29.1, 29.2

[56] References Cited

U.S. PATENT DOCUMENTS

| | | | |
|---|---|---|---|
| 3,152,686 | 10/1964 | Spindler | 72/422 |
| 3,611,770 | 10/1971 | Kralowetz | 72/422 |
| 3,696,651 | 10/1972 | Harrison | 72/420 |
| 3,901,161 | 8/1975 | Bertin | 105/29.1 |
| 3,901,162 | 8/1975 | Bertin | 105/29.1 |

FOREIGN PATENT DOCUMENTS

| | | | |
|---|---|---|---|
| 961835 | 6/1964 | United Kingdom | 72/422 |
| 1015711 | 1/1966 | United Kingdom | 72/422 |

*Primary Examiner*—Lowell A. Larson
*Attorney, Agent, or Firm*—Holman & Stern

[57] ABSTRACT

A forging manipulator for a forging machine is moved longitudinally by a rack and pinion mechanism comprising a pair of longitudinal guide rails on opposite sides of the manipulator, and respective toothed racks associated with these guide rails, the toothed racks being inclined inwards (in cross section), and the manipulator carriage being provided with a respective travel drive for meshing with each rack, the travel drives similarly having their axes inclined to the horizontal.

6 Claims, 1 Drawing Sheet

FORGING MANIPULATOR

BACKGROUND OF THE INVENTION

The invention relates to a forging manipulator, as required in particular in cooperation with forging machines. Forging machines, also referred to as radial forming machines, are provided with four centrally moved tools, which deform the forged piece uniformly with tools arranged opposite one another, the forged work-piece remaining in the main axis of the forging machine. The manipulator thus merely has the task of rotating the forged piece and moving it axially, so that the gripper carrier with the grippers engaging the forged piece is mounted only rotatably in a slide or carriage, and the slide or carriage is displaceable along a guide rail parallel to the main axis of the forging machine. The simple design made possible by the limited movability of the gripper carrier is adapted to these manipulators which must be kept narrow in order to retain the accessibility to the forging machine itself as far as possible and in order to be able to minimise the reach required at the loading and unloading devices and thus enable these devices themselves to be made with small dimensions, which in turn improves the accessibility of the forging machine per se.

In order to move the slides or carriages of these forging manipulators, travel drives, as known per se and customary for forging manipulators, could be provided. The latter comprise a motor which by way of a reduction gearing drives a gearwheel which engages in toothed racks which are arranged along the guide rail. They have the disadvantage that they require considerable space laterally, and obviate the advantage which the manipulators have in their simple design with respect to forging machines. Piston-cylinder units, whose suitability is lost per se on account of the long path of movement, are therefore used for moving the slides or carriages of these forging manipulators. There is also the further limitation that the manipulators require a free centre in the whole of the operating areafor the passage of workpieces and in particular for the passage of mandrel rods for forging hollow members by way of a mandrel.

SUMMARY OF THE INVENTION

The object of the invention is to provide a simple, long-stroke travel drive for a forging manipulator which, with the centre free, has a small space requirement in the centre of the manipulator. This object is attained according to the invention in that guide rails are disposed on both sides of the slide or carriage and toothed racks are disposed on inclined base surfaces and two travel drives are secured to the slide or carriage with their axes arranged in a V-shape. It is particularly advantageous, according to a further feature of the invention, for the base surfaces of the toothed racks and the axes of the travel drives to be arranged inclined at an angle of 60° to the horizontal.

BRIEF DESCRIPTION OF THE DRAWINGS

An embodiment of the invention is shown in the drawing, in which.

DESCRIPTION OF PREFERRED EMBODIMENTS

Figure 1:
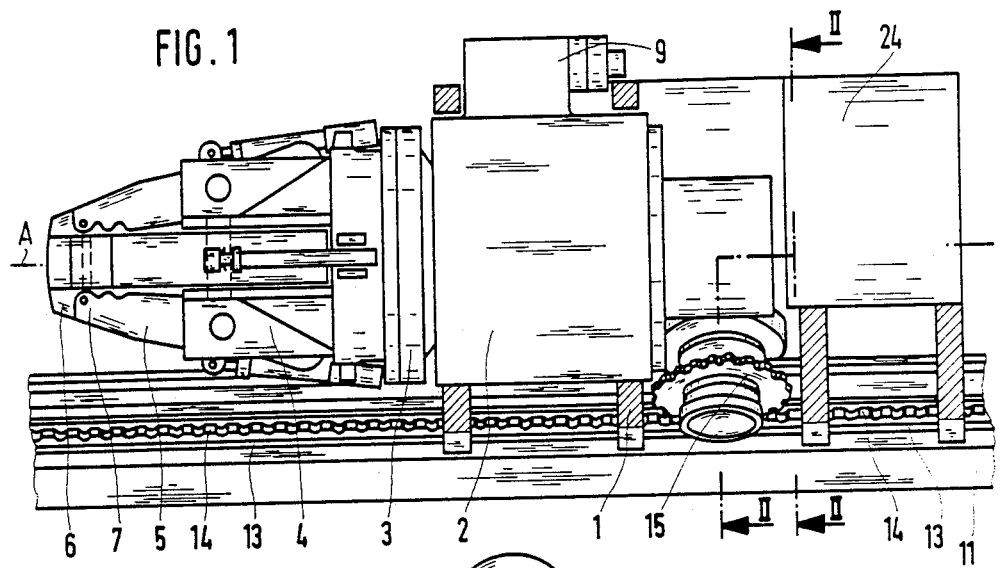
FIG. 1 is a side elevation of a forging manipulator embodying the invention.
Figure 2:
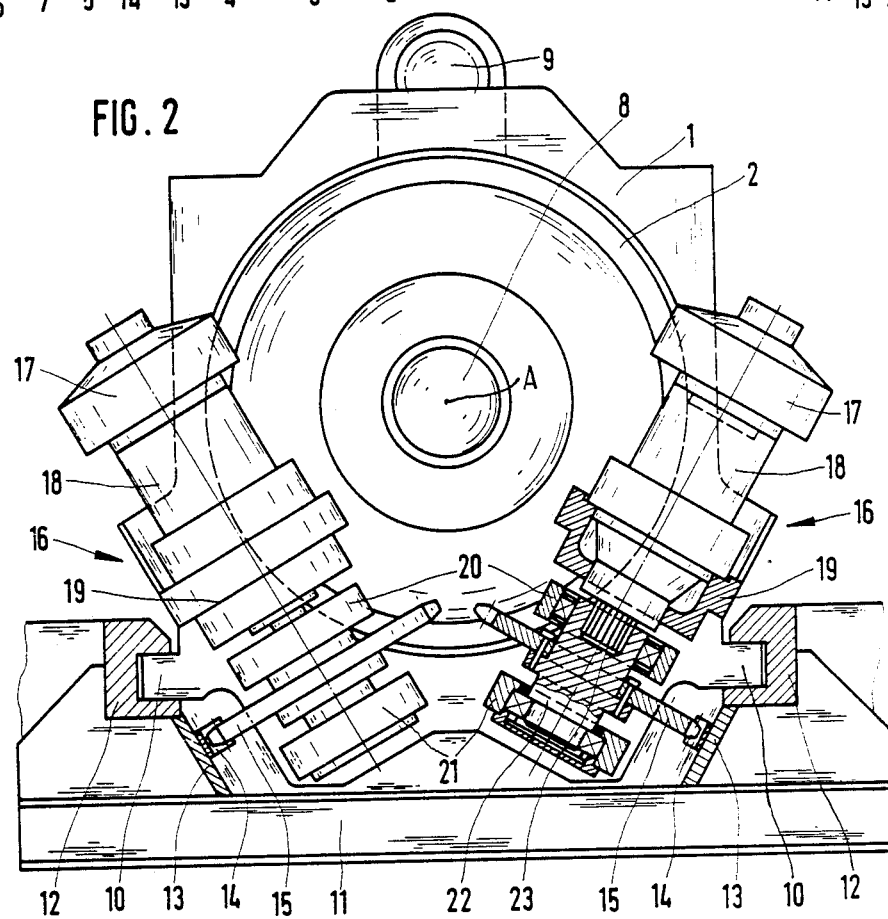
FIG. 2 is a section along the line II—II indicated in FIG. 1.

The manipulator shown has a bearing member 2 secured in a slide frame or carriage 1. A gripper carrier 3, in the bearing head 4 of which are pivotably mounted gripper arms 5 with clamping jaws 6 pivotably secured therein, is mounted in the bearing member 2 to rotate about the main axis A of the forging machine. The grippers 7 formed by the gripper arms 5 and the clamping jaws 6 can be opened and closed by displacement means (not shown). A through opening 8, through which the workpieces to be forged or mandrel rods for forging hollow members can be introduced axially into the forging machine (not shown), is provided between the grippers 7 with their displacement means and through the entire gripper carrier 3. The gripper carrier 3 is rotated in the bearing member 2 by an hydraulic motor 9 by way of gearwheels (not shown).

The slide frame 1 is provided with runners 10. A foundation frame 11 is provided with two U-shaped guide rails 12, in which the runners 10 of the slide frame 1 slide. Base plates 13, on the surfaces of which toothed racks 14 are secured, are arranged inclined below the guide rails 12. Gearwheels 15 engage in the toothed racks 14, and are associated with travel drives 16 which like the surfaces of the base plates 13 for the toothed racks 14 are arranged with their axes inclined at 60° to the horizontal and in a V-shaped manner to one another. The travel drives 16 comprise the hydraulic motors 17 and the reduction gears 18 which are flanged onto brackets 19. The gearwheels 15 are mounted in bearing blocks 20 and 21. The driven shafts of the reduction gears 18 engage in the shafts 22 of the gearwheels 15 with multiple-spline shafts 23.

The hydraulic motors 9 and 17 and the displacement means (not shown) for the gripper arms 5, which are hydraulically pressurised piston-cylinder units, are supplied by a central oil supply (not shown in detail) and are controlled therefrom.

I claim:

1. In a forging machine installation, comprising a forging machine having a horizontal main axis, forging manipulator means comprising a manipulator carriage, a gripper carrier supported on the carriage and rotatable about a horizontal axis corresponding to the main axis of the forging machine, and workpiece grippers movably mounted on the gripper carrier for gripping a workpiece; horizontal longitudinal guide means parallel to said main axis and disposed respectively on opposite sides of the manipulator carriage, the manipulator being supported by and slidable along said guide means; a respective toothed rack associated with each said guide means, disposed, in vertical cross section, at an inclination to the horizontal, with the teeth of said racks facing upwardly and inwardly with respect to said main axis; and for each said rack a respective travel drive secured to said manipulator carriage and provided with a respective drive pinion in mesh with the associated rack, the said travel drives and pinions having respective axes disposed in a V, as seen in the direction along said main axis.

2. A forging manipulator according to claim 1, wherein each rack and travel drive is inclined at an angle of 60° to the horizontal.

3. A forging manipulator according to claim 1 in which a through opening extends through the gripper carrier along its said axis.

4. A forging manipulator of claim 1 in which each said travel drive is essentially coaxial with its drive pinion.

5. A forging manipulator, in particular for a forging machine operating with four centrally moved tools, the grippers of which manipulator for engaging a forged workpiece, with their gripper carrier, are rotatable in a slide or carriage about a horizontal axis lying in the horizontal main axis of the forging machine, and the slide or carriage is displaceable on a frame supporting said slide or carriage along a guide rail provided on said frame parallel to the main axis of the forging machine and for this purpose is provided with a travel drive which with a gearwheel engages in a toothed rack arranged along the guide rail, characterized in that guide rails are disposed on both sides of the slide or carriage and toothed racks are disposed on inclined base surfaces provided on said frame and two travel drives are secured to the slide or carriage with their axes arranged in a V with respect to each other.

6. A forging manipulator according to claim 5, characterized in that the said base surfaces of the toothed racks and the axes of the travel drives are inclined at an angle of 60° to the horizontal.

* * * * *